United States Patent
Easley, Jr.

(10) Patent No.: US 7,347,036 B1
(45) Date of Patent: Mar. 25, 2008

(54) LAWN MOWER TOWING DEVICE

(76) Inventor: J. Alexander Easley, Jr., P.O. Box 1213, Kokomo, IN (US) 46903

( * ) Notice: Subject to any disclaimer, the term of this patent is extended or adjusted under 35 U.S.C. 154(b) by 220 days.

(21) Appl. No.: 11/303,273

(22) Filed: Dec. 16, 2005

(51) Int. Cl.
*A01D 75/30* (2006.01)

(52) U.S. Cl. .................. 56/6; 280/411.1; 172/313; 172/314

(58) Field of Classification Search ............ 280/411.1, 280/413, 483, 472, 103, 474; 172/313, 314; 56/6, 7, 13.6, DIG. 14
See application file for complete search history.

(56) References Cited

U.S. PATENT DOCUMENTS

| | | | |
|---|---|---|---|
| 2,139,200 A * | 12/1938 | Moyer | 56/7 |
| 2,699,957 A * | 1/1955 | White | 280/485 |
| 2,982,079 A * | 5/1961 | Schesser | 56/17.4 |
| 3,514,126 A * | 5/1970 | Fuss | 56/6 |
| 3,757,500 A * | 9/1973 | Averitt | 56/6 |
| 3,832,834 A * | 9/1974 | Kovacs | 56/6 |
| 4,063,748 A | 12/1977 | Schmidt | |
| 4,079,960 A | 3/1978 | Carson | |
| 4,287,706 A * | 9/1981 | Tobin, Jr. | 56/7 |
| 4,478,026 A * | 10/1984 | Mullet et al. | 56/7 |
| 4,637,625 A | 1/1987 | Blackwell | |
| 4,744,580 A * | 5/1988 | Ryan | 56/6 |
| 4,815,259 A * | 3/1989 | Scott | 56/6 |
| 4,896,485 A | 1/1990 | Gordy | |
| 5,423,565 A | 6/1995 | Smith | |
| 5,851,020 A | 12/1998 | Godwin et al. | |
| 6,526,735 B2 * | 3/2003 | Meyer | 56/6 |
| 2005/0034438 A1 * | 2/2005 | Burke et al. | 56/6 |

* cited by examiner

Primary Examiner—Árpád Fábián Kovács
(74) Attorney, Agent, or Firm—Bruce J. Bowman

(57) ABSTRACT

An assembly is provided for towing first and second push-type lawn mowers behind a riding mower. A base plate attachable to the rear of the riding mower releasably holds a tow bar. First and second tow arms are releasably coupled to the tow bar and are each adapted for pivoting motion relative to and in an arc defined by the tow bar. The first and second tow arms are received in respective first and second couplers that are attachable to the first and second push-type mowers, respectively. The first and second couplers allow releasable attachment of the respective first and second tow arms. Each coupler is configured to allow rotational movement thereof relative to the tow arm such that respective first and second mowers to which the first and second couplers are attached can follow the contours of the terrain, thereby providing an even cut. The towing assembly is easily disassembled and re-connectable. Likewise, each push-type mower is easily removed from the towing assembly for quick use. A mowing path width gauge may be provided on the riding mower.

17 Claims, 9 Drawing Sheets

LAWN MOWER TOWING DEVICE

BACKGROUND OF THE INVENTION

1. Field of the Invention

The present invention relates to devices for towing lawn mowers behind a riding mower for mowing a wider path during a mowing pass.

2. Background Information

The prior art has long recognized the desirability of towing one or more lawn mowers by a riding lawn mower or tractor in order to cut a wider swath or path during a particular pass. A lawn is thereby mowed more quickly than with a single riding mower or typical push-type lawn mower. As such, various towing assemblies have been proposed for ganging and/or towing a plurality of typical lawn mowers behind a riding mower or tractor for providing a wider mowing path during a single mowing pass.

With these prior art towing devices, however, it is time-consuming and/or difficult to disconnect even one of the towed lawn mowers from the towing device for ready use. The ready use of one of the towed lawn mowers would be desirable since it is typically not possible to mow very close to objects in the mowing area during mowing by a riding mower and towed mowers. In this situation, it is necessary to mow closer to the object which would be easily accomplished with a typical push-type lawn mower like those being towed. Additionally, it may be desirable to use such a typical push-type lawn mower to trim mow in places that are just not reachable with a combined riding lawn mower, towing device and towed lawn mowers.

Moreover, the prior art devices are not flexible. Particularly, the prior art devices are not easy to disassemble. Because many people have limited storage area, it is not practical to keep a towing device hooked onto the riding mower during storage. Also, the prior art devices are not easy to assemble once disassembled.

Still further, these prior art devices do not allow the towed mowers much freedom of movement. Particularly, such prior art towing device do not allow the towed mowers to navigate the terrain and still keep the mower level with the terrain to provide an even cut.

It is therefore evident from the above that there is a need for a lawn mower towing device that provides for quick and/or easy disconnection of the towed lawn mowers from the towing device.

It is further evident from the above that there is a need for a lawn mower towing device that provides for quick and/or easy connection/reconnection of disconnected towed lawn mowers to the towing device.

It is yet further evident from the above that there is a need for a lawn mower towing device that is easily disassembled from the towing mower.

It is still further evident from the above that there is a need for a lawn mower towing device that is easily connectable once disassembled.

It is even further evident from the above that there is a need for a lawn mower towing device that allows the towed mowers greater freedom of movement in order for the towed mowers to navigate the terrain and provide an even cut.

SUMMARY OF THE INVENTION

An assembly is provided for towing push-type lawn mowers behind a riding mower and is particularly suited for towing first and second push-type lawn mowers behind the riding mower. The towing assembly allows quick and easy disconnection and reconnection of either one or both of the first and second lawn push-type mowers. The towing assembly is also quickly and easily disassembled and reassembled for storage.

A base plate attachable to the rear of the riding mower releasably holds a tow bar. First and second tow arms are releasably coupled to the tow bar and are each adapted for pivoting motion relative to and in an arc defined by the tow bar. The first and second tow arms are received in respective first and second couplers that are attachable to the first and second push-type mowers, respectively. The first and second couplers allow releasable attachment of the respective first and second tow arms. Each coupler is configured to allow rotational movement thereof relative to the tow arm such that respective first and second mowers to which the first and second couplers are attached can follow the contours of the terrain, thereby providing an even cut. The towing assembly is easily disassembled and re-connectable. Likewise, each push-type mower is easily removed from the towing assembly for quick use.

In one form, there is provided an assembly for towing first and second push-type mowers behind a riding mower. The assembly includes a base plate, a tow bar, a first tow arm, a second tow arm, a first coupling and a second coupling. The base plate is configured for attachment to a hitch of the riding mower and includes a channel situated axially behind right and left rear wheels of the riding mower. The tow bar is releasably disposed in the channel of the base plate and includes a first attachment flange and a second attachment flange. The first tow arm is releasably connected to the first attachment flange and is configured for pivoting side to side movement along a horizontal of an axis of the tow bar. The second tow arm is releasably connected to the second end of the tow bar and is configured for pivoting side to side movement along the horizontal of the axis of the tow bar. The first coupling is attachable to a front of the first push-type mower and is configured for releasable coupling with the first tow arm and to allow rotational movement of the first coupling relative to the first tow arm. The second coupling is attachable to a front of the second push-type mower and is configured for releasable coupling with the second tow arm and to allow rotational movement of the second coupling relative to the second tow arm.

In another form, there is provided an assembly for towing first and second push-type mowers behind a riding mower. The assembly includes a base plate, a tow bar, a first tow arm, a second tow arm, a first coupling and a second coupling. The base plate is configured for attachment to a hitch of the riding mower and includes a channel situated axially behind right and left rear wheels of the riding mower. The tow bar is composed of a middle section, a separate first side section and a separate second side section. The middle section is releasably disposed in the channel of the base plate and has a first middle section end and a second middle section end. The first side section is coupled to the first middle section end via a first shear pin structure. The second side section is coupled to the second middle section end via a second shear pin structure. The first shear pin structure is configured to allow detachment of the first side section from the middle section upon the first push-type mower impacting an object. The second shear pin structure is configured to allow detachment of the second side section from the middle section upon the second push-type mower impacting an object. The first tow arm is releasably connected to the first side section and is configured for pivoting side to side movement along a horizontal of an axis of the tow bar. The second tow arm is releasably connected to the second side section and is configured for pivoting side to side movement along the horizontal of the axis of the tow bar. The first coupling is attachable to a front of the first push-type mower and is configured for releasable coupling with the first tow arm and to allow rotational movement of the first coupling relative to the first tow arm to provide terrain contour following movement by the first push-type mower. The second coupling is attachable to a front of the second push-type mower and is configured for releasable coupling with the second tow arm and to allow rotational movement of the second coupling relative to the second tow arm to provide terrain contour following movement by the second push-type mower.

In yet another form, the present invention is an assembly for towing first and second push-type mowers behind a riding mower that includes a base plate, a tow arm, first and second tow arms, first and second couplings, and a mowing path gauge. The base plate is configured for attachment to a hitch of the riding mower and includes a channel situated axially behind right and left rear wheels of the riding mower. The tow bar is releasably disposed in the channel of the base plate and includes a first attachment flange and a second attachment flange. The first tow arm is releasably connected to the first attachment flange and is configured for pivoting side to side movement along a horizontal of an axis of the tow bar. The second tow arm is releasably connected to the second end of the tow bar and is configured for pivoting side to side movement along the horizontal of the axis of the tow bar. The first coupling is attachable to a front of the first push-type mower and is configured for releasable coupling with the first tow arm and to allow rotational movement of the first coupling relative to the first tow arm. The second coupling is attachable to a front of the second push-type mower and is configured for releasable coupling with the second tow arm and to allow rotational movement of the second coupling relative to the second tow arm. The mowing path gauge is connectable to a front of the riding mower and is adapted to physically show the overall mowing width of the riding mower and the first and second push-type lawn mowers.

A feature of the present invention is the ease of assembly (connection) and disassembly (disconnection) that allows the easy and quick independent use of one of the push mowers being towed.

The present invention will be more apparent upon reading the following detailed description in conjunction with the accompanying drawings.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Like reference numerals, if any, tend to indicate the same or similar parts throughout the several figures.

DETAILED DESCRIPTION OF PREFERRED EMBODIMENTS

Figure 1:
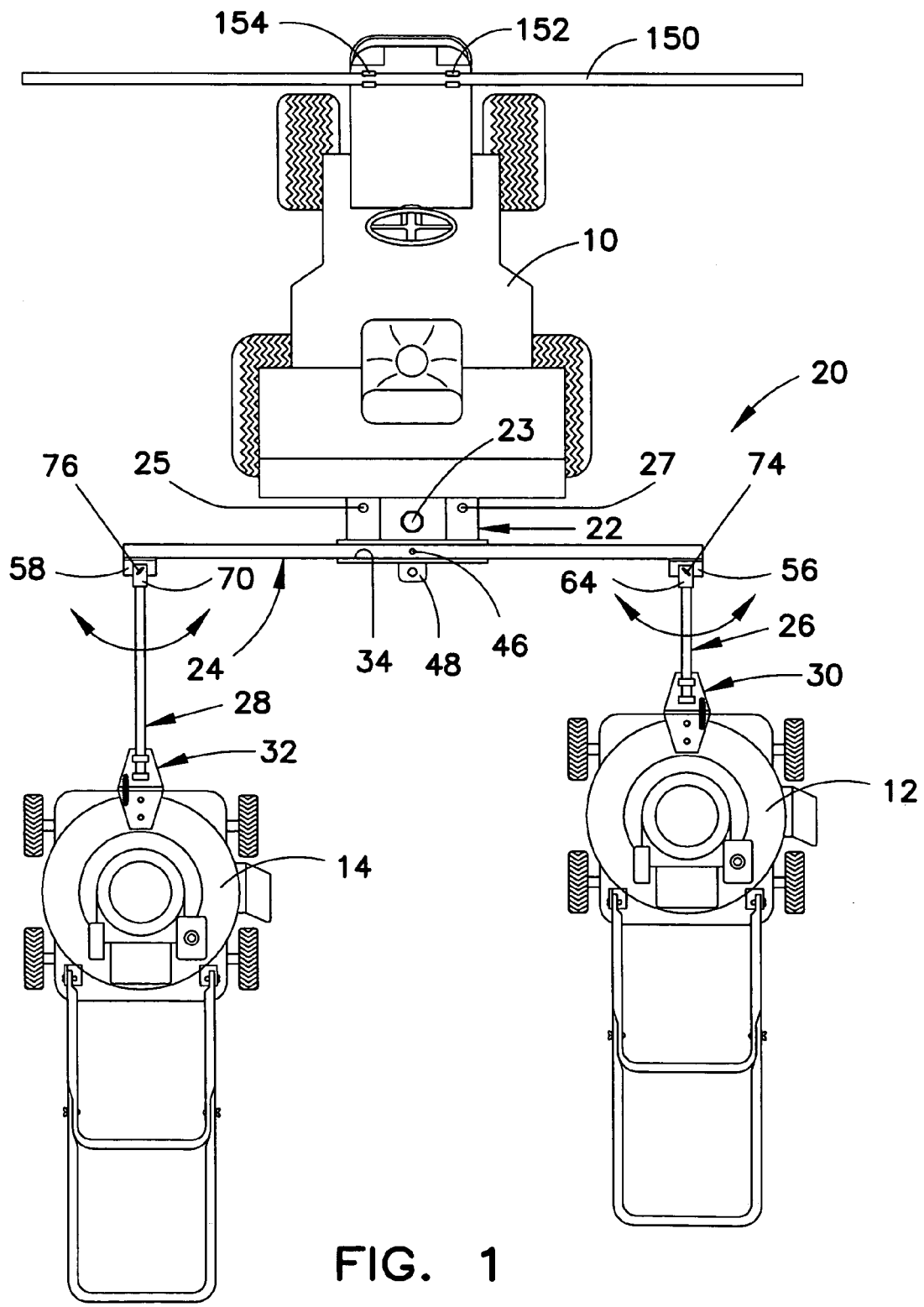
FIG. 1 is a top view of an exemplary embodiment of the present towing device connected between a riding mower and two push-type lawn mowers.

Referring now to FIG. 1, there is depicted a typical riding lawn mower, tractor or the like 10 having a towing device 20 fashioned in accordance with the principles of the present invention. The towing device 20 is shown coupled to and thereby towing a first push-type or walk behind lawn mower 12 and a second push-type or walk behind lawn mower 14. The lawn mowers 12 and 14 may be of any type.

The towing assembly 20 includes a base plate 22 that is attachable to a rear of the riding mower 10. Preferably, but not necessarily, the base plate 22 is at least attachable to a hitch of the riding mower (not seen) by a bolt 23 that extends through a hole of the hitch and is secured by a nut or the like on the underside thereof. Particularly, and referring additionally to FIG. 2, the plate 22 is formed by a body 38 that is preferably, but not necessarily, formed of a metal. The body 38 has a middle portion 39 and two side portions 40 and 41 that are separate from and axially upwardly spaced relative to and from the middle portion 39 (see e.g., FIG. 3). The middle portion 39 includes a bore 42 through which the bolt 23 is passed for securing the plate 22 to the riding mower 10. The two side portions 40, 41 each have a respective bore 25, 27 through which bolts (not shown) may be passed and through the rear of the riding mower 10 for providing additional securing of the plate 22 to the riding mower 10. Particularly, the existing hitch plate of the riding mower extends between the middle portion 39 and the two side portions 40, 41.

The plate 22 includes a channel, trough or the like 34. When the plate 22 is attached to the riding mower 10, the channel is oriented essentially parallel to or coaxially with the axles of the riding mower 10. A tow bar 24 of the towing assembly 20 is releasably disposed in the channel 34. The tow bar 24 is thus behind and essentially parallel with or coaxial to the rear axle of the riding mower 10.

Figure 3:
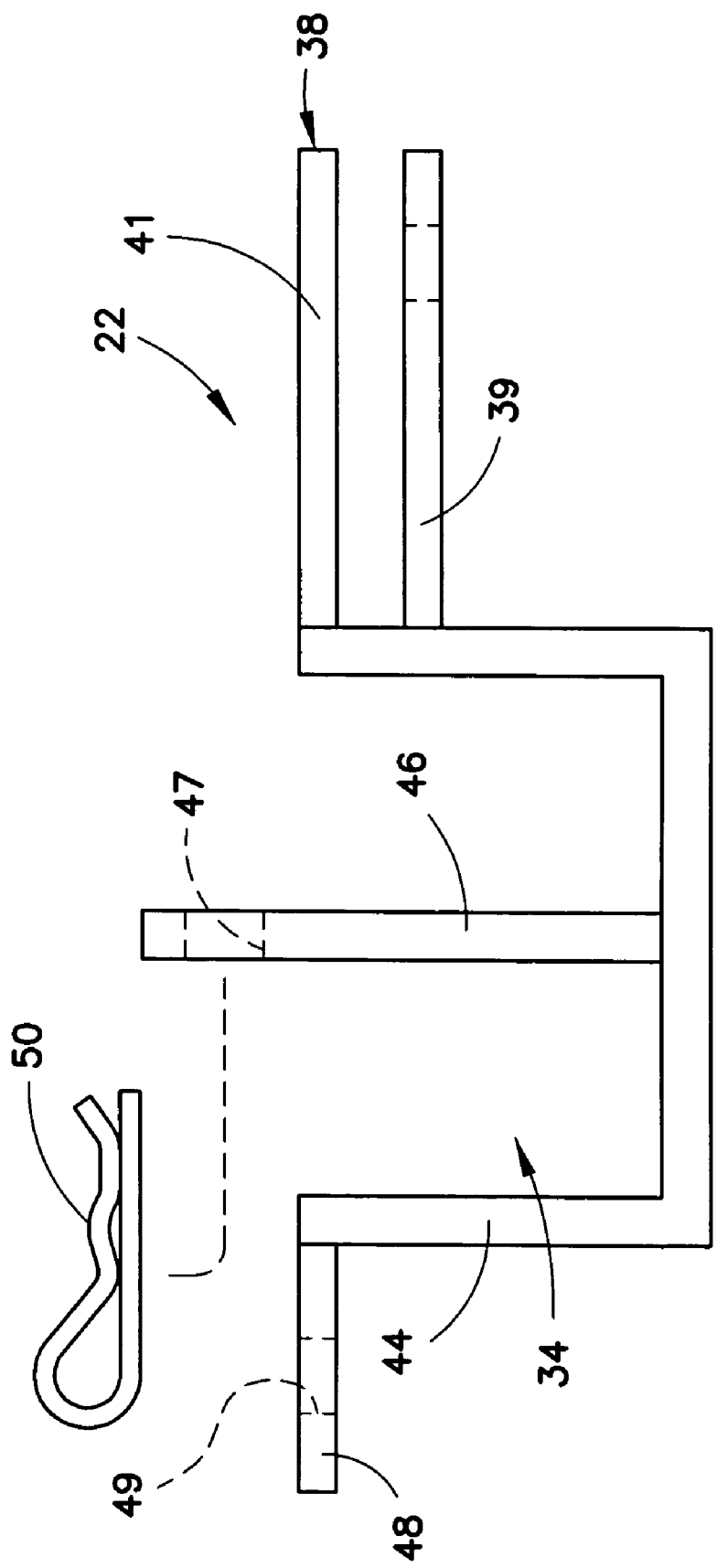
FIG. 3 is a side view of the base plate of the towing device taken along line 3-3 of FIG. 2.

The body 38 of the plate 22 has an elongated U-member 44 that defines the channel 37. Referring additionally to FIG. 3, the U-member 44 is shown from the side such that the channel 37 is more easily discerned. A pin or post 46 is disposed in the channel 37. The post 46 extends from the base of the U-member 44 perpendicular to the base thereof. A bore 47 is disposed through the post 46. The post 46 has a height that exceeds the height of the U-member 44 with the bore 47 also exceeding the height thereof such that when the tow bar 24 is disposed in the channel 37, the bore 47 and thus the post 46 are above the tow bar 24. In this manner, a cotter pin, quick release pin, spring pin or the like 50 is releasably receivable in the bore 47 to retain the tow bar 24 in place.

Additionally, the plate 22 includes a hitch flange 48 extending from the U-member 44. The hitch flange 48 includes a bore 49. The hitch flange 48 and bore 49 are configured as an alternative hitch since the original hitch of the riding mower 10 is used to attach the plate 22. An optional pad, foam piece or the like 120 may be provided for covering the end of the flange 48.

The tow bar 24 is preferably, but not necessarily, formed of metal. The tow bar 24 is sized and/or configured to be received in the channel 34. The channel 34 is of sufficient length to provide lateral stability to the tow bar 24 when towing the first and second mowers 12 and 14. While the channel 34 and tow bar 24 are depicted as and preferably are rectangular in cross-section, other configurations may be used. The tow includes a bore 54 that is sized to be received onto the pin 46 of the plate 22.

A first flange 56 is disposed at one end of the tow bar 24. The first flange 56 includes a bore 57. A second flange 58 is disposed at another end of the tow bar 24. The second flange 58 includes a bore 59. The first and second flanges 56, 58 provide attachment or coupling platforms for first and second tow arms 26 and 28 of the tow assembly 20. The first tow arm 26 is formed of a rod 62 that is preferably, but not necessarily, metal. A front end of the rod 62 has a U-bracket 64 with bore 65 through both legs thereof. The U-bracket 64 is configured to receive the first attachment flange 56 within the U-bracket 64 and provide alignment between the bores 65 of the U-bracket 64 and the bore 57 of the flange 56. A handled pin 74 provides quick and easy coupling of the U-bracket 56 to the flange 56 along with coupling pin 122 that provides a quick release attachment to the end or shaft of the handled pin 74. The configuration and handled pin 74 allow the tow arm 26 to pivot from left to right in a plane defined by the tow bar (as represented by the double-headed arrow).

Likewise, the second tow arm 28 is formed of a rod 68 that is preferably, but not necessarily, metal. A front end of the rod 68 has a U-bracket 70 with bore 71 through both legs thereof. The U-bracket 70 is configured to receive the second attachment flange 58 within the U-bracket 70 and provide alignment between the bores 71 of the U-bracket 70 and the bore 59 of the flange 58. A handled pin 76 provides quick and easy coupling of the U-bracket 70 to the flange 58 along with coupling pin 124 that provides quick release attachment to the end or shaft of the handled pin 76. The configuration and handled pin 76 allow the tow arm 28 to pivot from left to right in a plane defined by the tow bar (as represented by the double-headed arrow).

The two arms 26, 28 are preferably different lengths such as is shown in FIG. 1. The difference in lengths is such that the discharge from the mower 14 does not interfere with and/or discharge into the mower 12. In view of the direction of discharge of the mower 14 relative to the mower 12, the mower 12 is ahead of the mower 14 by virtue of the tow arm 26 being shorter than the tow arm 28. The tow arms may, however, be the same length if desired, or may be different than that shown.

Figure 2:
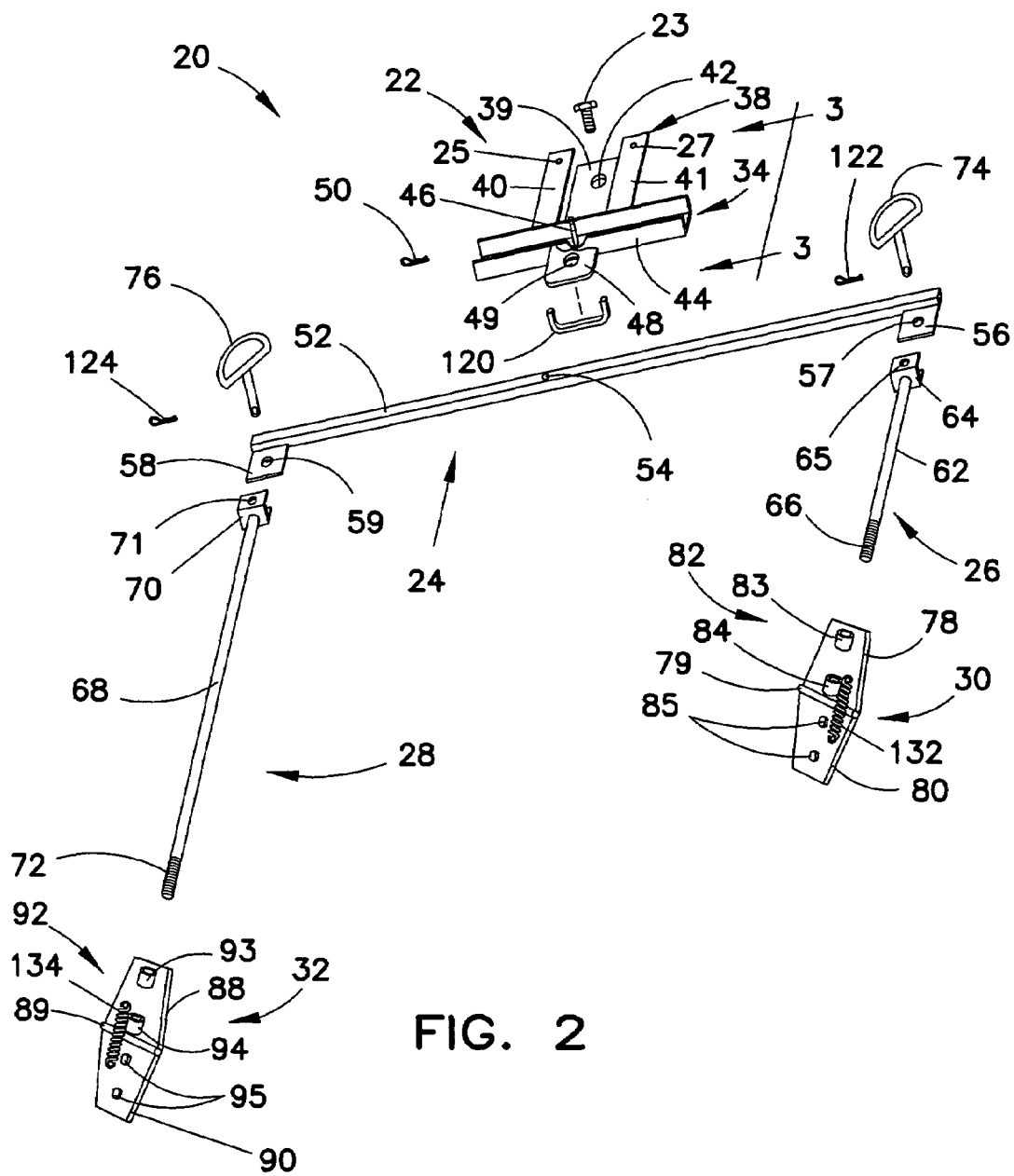
FIG. 2 is an exploded view of various components of the present exemplary towing device of FIG. 1.

The rod 62 of the first tow arm 26 has a threaded end 66 that is adapted to be received in a first coupling 30. Likewise, the rod 68 of the second tow arm 28 has a threaded end 72 that is adapted to be received in a second coupling 32. The first coupling 30 is formed of a front plate 78 and a rear plate 80 that are pivotally coupled to one another by a hinge 79. The front and rear plates 78, 80 are preferably, but not necessarily, formed of metal. The front plate 78 includes a tow arm receptor 82 that is configured to receive and retain an end of the tow arm 26. The tow arm receptor 82 has a first sleeve 83 that is essentially tubular and configured to slidingly receive and pass the threaded end 66 therethrough. The tow arm receptor 82 also includes a second sleeve 84 that is also essentially tubular in configuration but is also internally threaded to threadedly receive the threaded end 66 of the tow arm 26. The rear plate 80 of the first coupling 30 includes two bores 85 for receiving screws, bolts or the like for mounting the first coupling 30 to the first push-type lawn mower 12. A spring 132 or other biasing element is connected between the front and rear plates 78, 80. The spring 132 biases the plates 78 and 80 into a closed position (the open position of which is depicted in FIG. 2).

The second coupling 30 is formed of a front plate 88 and a rear plate 90 that are pivotally coupled to one another by a hinge 89. The front and rear plates 88, 90 are preferably, but not necessarily, formed of metal. The front plate 88 includes a tow arm receptor 92 that is configured to receive and retain an end of the tow arm 28. The tow arm receptor 92 has a first sleeve 93 that is essentially tubular and configured to slidingly receive and pass the threaded end 72 therethrough. The tow arm receptor 92 also includes a second sleeve 94 that is also essentially tubular in configuration but is also internally threaded to threadedly receive the threaded end 72 of the tow arm 28. The rear plate 90 of the second coupling 32 includes two bores 95 for receiving screws, bolts or the like for mounting the second coupling 32 to the second push-type lawn mower 14. A spring 134 or other biasing element is connected between the front and rear plates 88, 90. The spring 134 biases the plates 88 and 90 into a closed position (the open position of which is depicted in FIG. 2).

Figure 4:
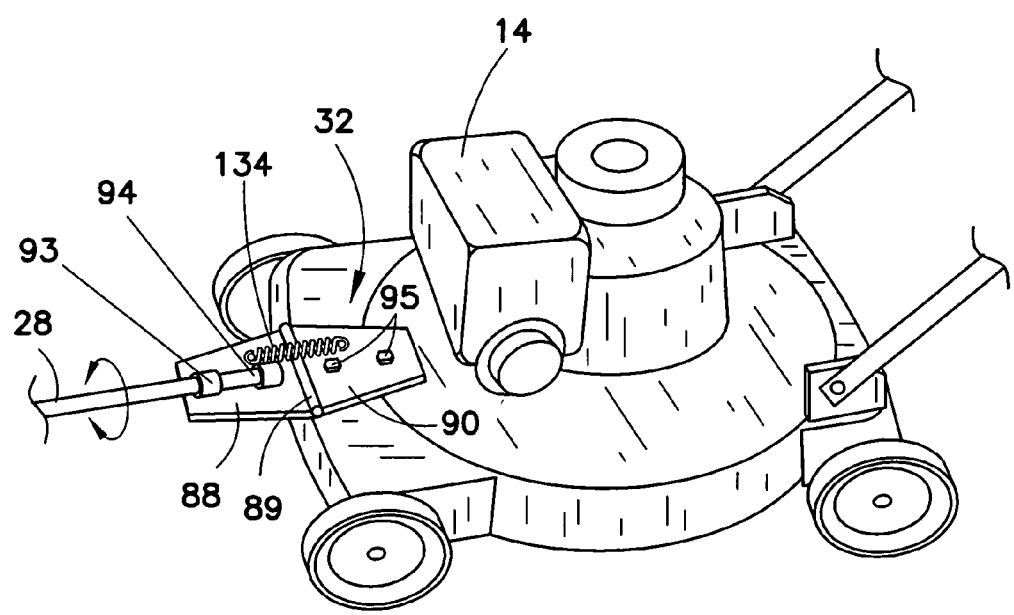
FIG. 4 is a side view of a portion of the present exemplary towing device of FIG. 1 illustrating the manner of attachment and movement between a main towing arm of the towing device and one of the push-type lawn mowers.

The first and second couplings 30, 32 fixedly attach to the first and second mowers 12, 14 respectfully. Particularly the rear plate of each coupling is fixedly attached to the mower deck of the respective mower by bolts, screws or the like via the bores in the rear plate. Each coupling 30, 32 is thus fixed to the respective mower 12, 14 such that the coupling moves with the mower as the mower moves with the change in terrain. Referring to FIG. 4, the coupling 32 is shown mounted to the mower 14. The tow arm 28 is received in the rod receptors. Once coupled to the tow bar 24, the tow arm 28 is fixed against rotation. However, since the tow arm 28 is threadedly received in the second tube and the tow arm 28 is freely rotatable relative to the first tube, the coupling 32 is free to rotate relative to the tow are 28 as the mower 14 moves from side to side (as represented by the double headed arrow). Therefore, as the mower 14 navigates over variable terrain, the mower is free to rotate relative to the tow arm 28. As well, since the coupling 32 is hinged, the mower may move forward and back relative to the tow arm. The spring 134 causes pressure to be exerted on the front of the mower 14 which compensates for the moment created by the handle of the mower 14.

Figure 5:
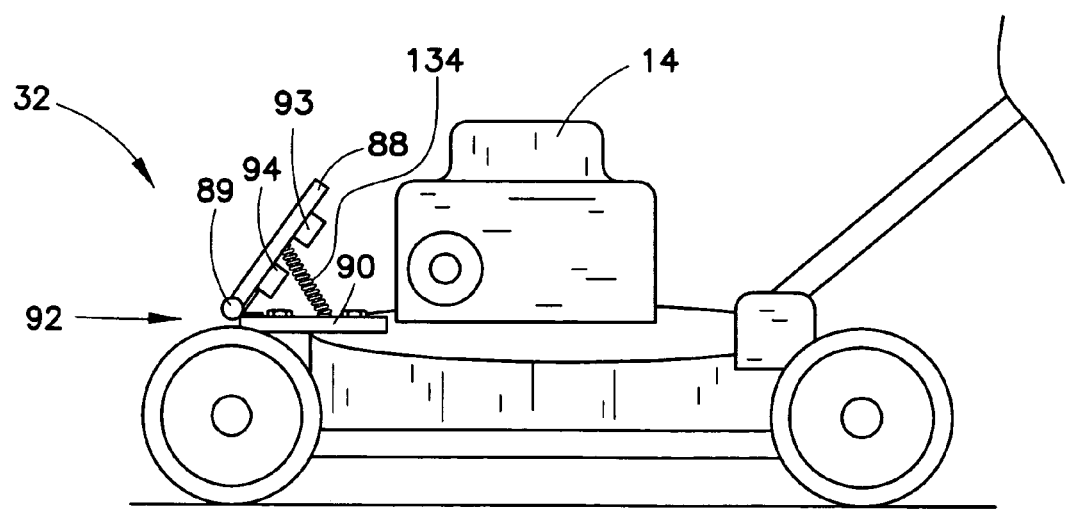
FIG. 5 is a side perspective view of a front portion of one of the push-type lawn mowers having a connecting portion of the present exemplary towing device illustrating the connecting portion in an unattached state.

FIG. 5 illustrates a feature of the present invention, again with respect to the mower 14. Particularly, when the tow arm 28 is disconnected from the coupling 32, the front plate 88 is biased by spring 134 to move backward toward the rear of the mower. In this manner the coupling 32 does not hinder normal operation of the mower 14 when the mower 14 is disconnected from the tow arm.

Figure 6:
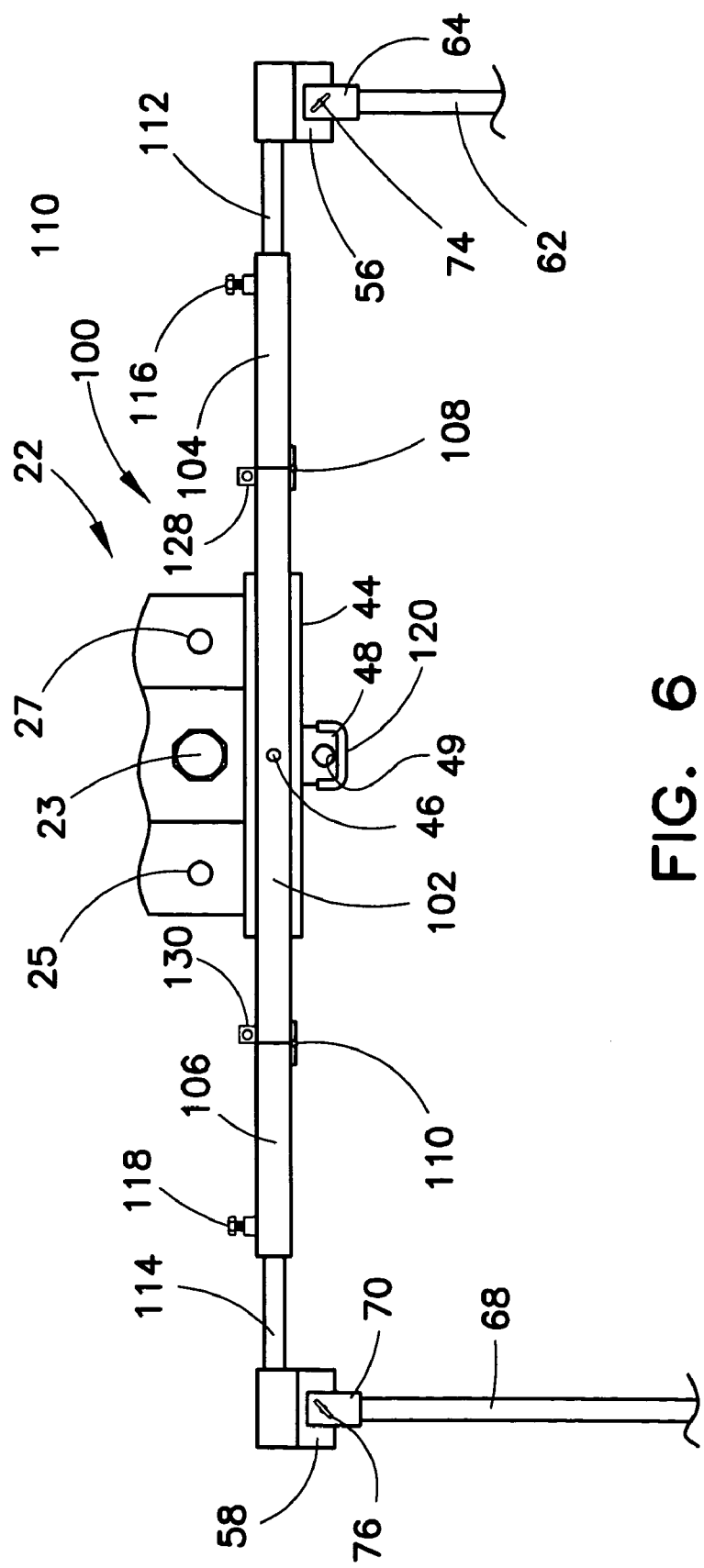
FIG. 6 illustrates alternative embodiments of a main towing arm for the present towing device.

Referring to FIG. 6 alternative embodiments or features of a tow bar 100 are depicted. The tow bar 100 is formed of a middle section 102 that releasably fits into the channel of the U-member 44 of the plate 22 in like manner to the tow bar 24. The tow bar 100, however, has a separate right side section 104 and a separate left side section 106. The right side section 104 is pivotally connected to the middle section 102 by a hinge or hinge structure 108. The left side section 106 is pivotally connected to the middle section 102 by a hinge or hinge structure 110. The hinge 108 allows the right side section 104 to pivot back from the middle section 102. The hinge 110 allows the left side section 106 to pivot back from the middle section 102.

Pivoting of the right side section 104 is managed by use of a shear structure 128 disposed opposite to the hinge 108. The shear structure 128 comprises a shear pin held by brackets formed on the end of sections 102, 104. The shear pin of the shear structure 128 is of an appropriate shear strength such that sufficient force exerted onto the right side section 104 (and/or its appendages) such as upon contacting an object, causes the shear pin to shear or break. This allows the end 104 and thus the push mower being towed to pivot back.

Pivoting of the left side section 106 is managed by use of a shear structure 130 disposed opposite to the hinge 110. The shear structure 130 comprises a shear pin held by brackets formed on the end of sections 102, 106. The shear pin of the shear structure 130 is of an appropriate shear strength such that sufficient force exerted onto the left side section 106 (and/or its appendages) such as upon contacting an object, causes the shear pin to shear or break. This allows the end 106 and thus the push mower being towed to pivot back. Each side section 104, 106 is easily reconnected by pivoting the structure then replacement of the shear hinge pin.

Additionally or separate from the above modification, the tow bar 100 may include adjustable length ends. Particularly a right inner rod 112 is telescopingly received in the right side section 104 such that the right inner rod 112 provides length adjustment by moving the right inner rod 112 in and out of the right side section 104 accordingly. A set screw 116, mounted to the bar by a threaded nut or the like, sets the desired length. The right inner rod 112 would include the attachment flange 56 for coupling the tow arm rod 62. In like manner a left inner rod 114 is telescopingly received in the left side section 106 such that the left inner rod 114 provides length adjustment by moving the left inner rod 114 in and out of the left side section 106 accordingly. A set screw 118, mounted to the bar by a threaded nut or the like, sets the desired length. The left inner rod 114 would include the attachment flange 58 for coupling the tow arm rod 68.

Referring back to FIG. 1, the towing assembly 20 may include a mowing gauge. The mowing gauge is characterized by a rod or the like 150 that is mounted to the front of the riding mower 10. Preferably, the gauge 150 is releasably mounted to the front of the riding mower 10. This may be accomplished by first and second mounting clips, magnets or the like 152, 154. The mowing gauge 150 is sized (in length) to span the mowing path covered by the riding mower 10 and the first and second mowers 12, 14. Particularly, the gauge 150 is of a length that spans from an outside of the mower 12 to the outside of the mower 14. In this manner, the rider or operator of the riding mower 10 knows the mowing path width of each pass without having to look rearward.

Additionally, the rod 150 of the mowing gauge may be length adjustable in like manner as the tow bar 100 as depicted in FIG. 6. This accommodates the use of the adjustable tow bar 100.

Figure 7:
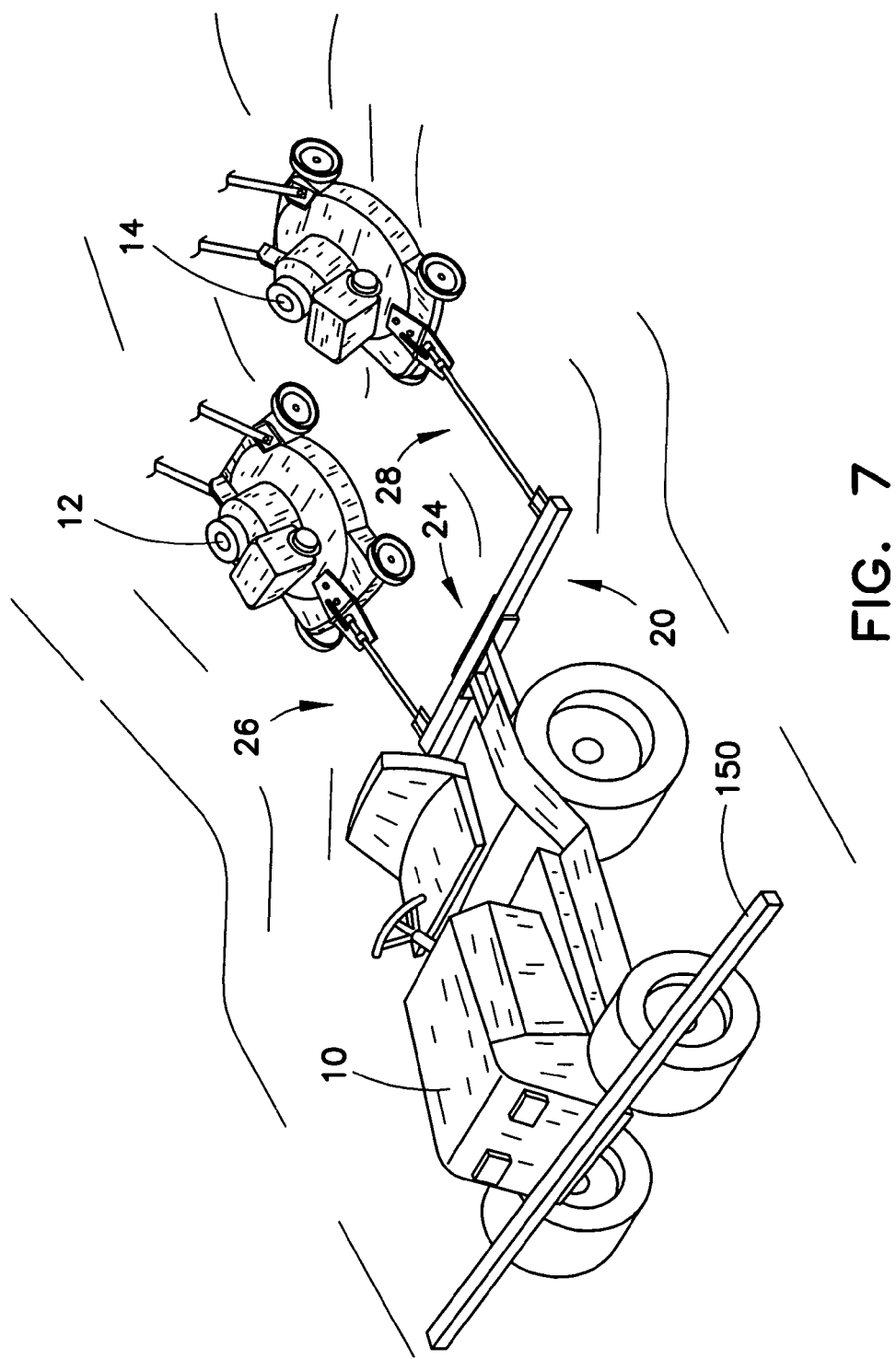
FIG. 7 is a perspective view of a riding mower towing two push-type lawn mowers over variable terrain via the present towing device particularly illustrating the ability of the present towing device to allow each push-type lawn mower to mow different variable terrain.

FIG. 7 depicts the riding mower 10 towing the two push-type lawn mowers 12 and 14 over uneven terrain. The two push-type lawn mowers 12 and 14 encountering different uneven terrain wherein the front brackets of the present towing device allowing the two push-type lawn mowers to articulate as appropriate for the terrain in order to conform to the surface being mowed.

Figure 8:
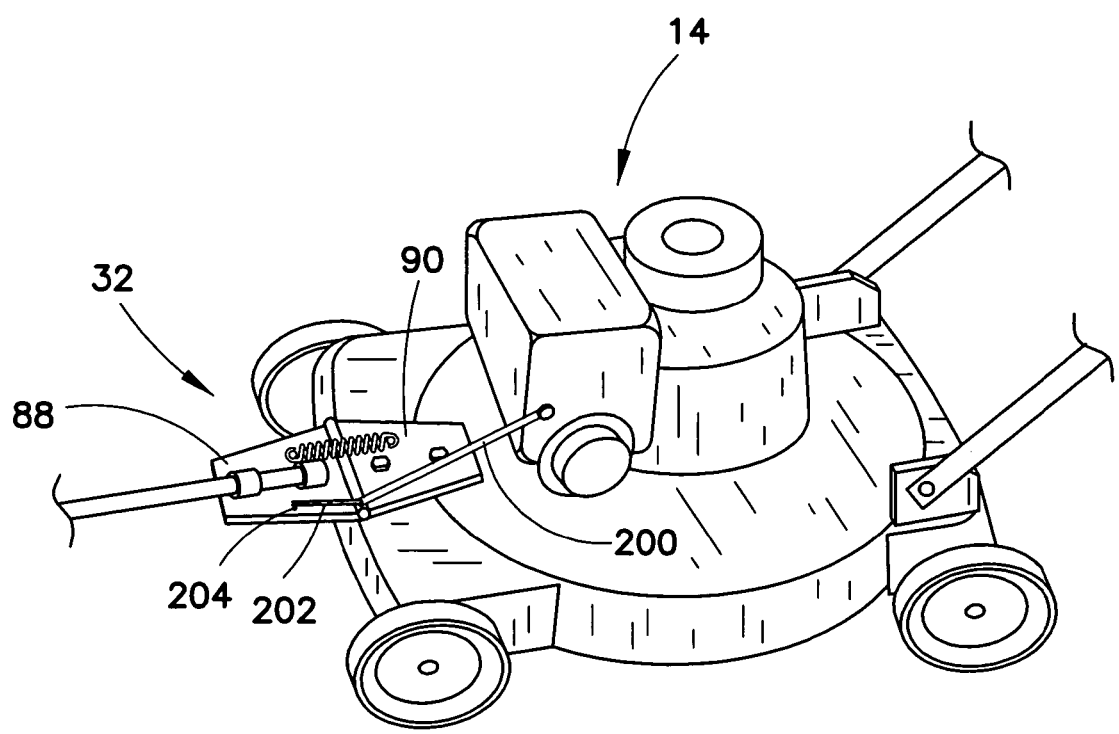
FIG. 8 is a perspective view of a push-type lawn mower coupled to the present towing device wherein a dead-man cable of the push-type lawn mower is operatively attached to the front bracket of the present towing device, the dead-man cable situated so as to allow the push-type lawn mower to operate during towing.
Figure 9:
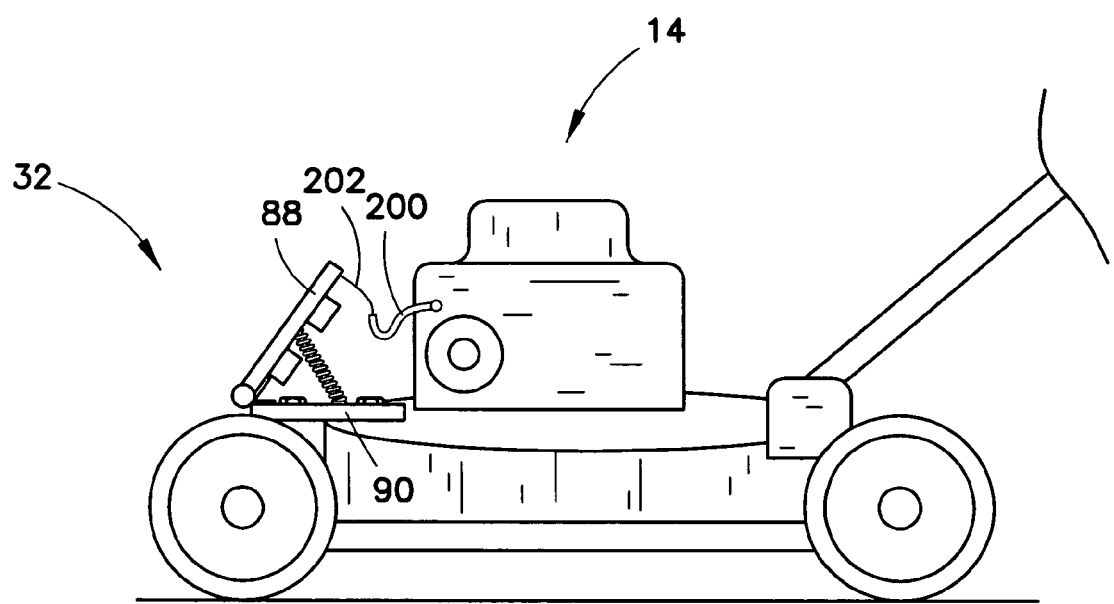
FIG. 9 is a perspective view of the push-type lawn mower wherein the front bracket of the present towing device is disconnected from the remainder of the present towing device and the dead-man cable is situated so as to stop the push-type lawn mower.

FIGS. 8 and 9 depict a manner of attaching a dead-man cable for a dead-man feature of the push-type lawn mower 14 such that the dead-man feature is operative with the use of the present towing device. Particularly, if desired, a dead-man cable (e.g. Bowden cable) 200 from the dead-man feature of the mower 14 has an internal wire cable 202 that is attached at 204 to the end 88 of the front bracket 32. When the end 88 of the bracket 32 is attached to the towing rod as depicted in FIG. 8, the mower is operative. When the end 88 of the bracket 32 is disengaged from the towing arm, the end plate swings upward under spring force as depicted in FIG. 9. This position actuates (releases) the dead-man feature to stop the mower 14.

It should also be appreciated that another towing assembly or portions thereof may be used on one or more of the push-type mowers. The towing assembly would be mounted to the push-type mower and itself tow one or two more push-type mowers. Various configurations are contemplated.

While the invention has been illustrated and described in detail in the drawings and foregoing description, the same is to be considered as illustrative and not restrictive in character, it being understood that only preferred embodiments has been shown and described and that all changes and modifications that come within the spirit of the invention are desired to be protected.

What is claimed is:

1. An assembly for towing first and second push-type mowers behind a riding mower, the assembly comprising:
  a base plate configured for attachment to a hitch of the riding mower, the base plate having a channel situated axially behind right and left rear wheels of the riding mower the channel having a post extending perpendicular to the channel with the post having a bore for receipt of a retention pin;
  a tow bar releasably disposed in the channel of the base plate, the tow bar having a first attachment flange, a second attachment flange and a bore sized to be received on the post;
  a first tow arm releasably connected to the first attachment flange and configured for pivoting side to side movement along a horizontal of an axis of the tow bar;
  a second tow arm releasably connected to the second end of the tow bar and configured for pivoting side to side movement along the horizontal of the axis of the tow bar;
  a first coupling attachable to a front of the first push-type mower, the first coupling configured for releasable coupling with the first tow arm and to allow rotational movement of the first coupling relative to the first tow arm; and
  a second coupling attachable to a front of the second push-type mower, the second coupling configured for releasable coupling with the second tow arm and to allow rotational movement of the second coupling relative to the second tow arm.

2. The assembly of claim 1, wherein the first and second low arms are different lengths.

3. The assembly of claim 1, wherein:
the channel has a post extending perpendicular to the channel, the post having a bore for receipt of a retention pin; and
the tow bar includes a bore sized to be received on the post.

4. The assembly of claim 1, wherein the base plate includes a hitch.

5. The assembly of claim 1, wherein:
the first attachment flange includes a first bore;
the second attachment flange includes a second bore;
the first tow arm includes a first U-member situated at a front end of the first tow arm, the first U-member having bores through first and second legs of the first U-member;
the second tow are includes a second U-member situated at a front end of the second tow arm, the second U-member having bores through first and second legs of the second U-member;
the assembly further including a first removable pin extending through the bores in the first and second legs of the first U-member and the first bore of the first attachment flange; and
the assembly further including a second removable pin extending through the bores in the first and second legs of the second U-member and the second bore of the second attachment flange.

6. The assembly of claim 1, wherein:
a rear end of the first tow arm is threaded;
a rear end of the second tow arm is threaded;
the first coupling includes a first threaded receptor configured to threadedly receive the threaded rear end of the first tow arm and thereby allow the rotational movement of the first coupling relative to the first tow arm; and
the second coupling includes a second threaded receptor configured to threadedly receive the threaded rear end of the second tow arm and thereby allow the rotational movement of the second coupling relative to the second tow arm.

7. The assembly of claim 1, wherein:
the first coupling is configured to allow unobstructed use of the first push-type mower after uncoupling of the first tow arm from the first coupling; and
the second coupling is configured to allow unobstructed use of the second push-type mower after uncoupling of the second tow arm from the second coupling.

8. An assembly for towing first and second push-type mowers behind a riding mower, the assembly comprising:
a base plate configured for attachment to a hitch of the riding mower, the base plate having a channel situated axially behind right and left rear wheels of the riding mower;
a tow bar composed of a middle section, a separate first side section and a separate second side section, the middle section releasably disposed in the channel of the base plate and having a first middle section end and a second middle section end, the first side section coupled to the first middle section end via a first shear pin structure, the second side section coupled to the second middle section end via a second shear pin structure, the first shear pin structure configured to allow detachment of the first side section from the middle section upon the first push-type mower impacting an object, the second shear pin structure configured to allow detachment of the second side section from the middle section upon the second push-type mower impacting an object;
a first tow arm releasably connected to the first side section and configured for pivoting side to side movement along a horizontal of an axis of the tow bar;
a second tow arm releasably connected to the second side section and configured for pivoting side to side movement along the horizontal of the axis of the tow bar;
a first coupling attachable to a front of the first push-type mower, the first coupling configured for releasable coupling with the first tow arm and to allow rotational movement of the first coupling relative to the first tow arm to provide terrain contour following movement by the first push-type mower; and
a second coupling attachable to a front of the second push-type mower, the second coupling configured for releasable coupling with the second tow arm and to allow rotational movement of the second coupling relative to the second tow arm to provide terrain contour following movement by the second push-type mower.

9. The assembly of claim 8, wherein the first and second shear pin structures are shear pin hinges.

10. The assembly of claim 8, wherein the first and second tow arms are different lengths.

11. The assembly of claim 8, wherein:
the channel has a post extending perpendicular to the channel, the post having a bore for receipt of a retention pin; and
the middle section of the tow bar includes a bore sized to be received on the post.

12. The assembly of claim 8, wherein:
the first side section has a first attachment flange with a first bore;
the second side section has a second attachment flange with a second bore;
the first tow arm includes a first U-member situated at a front end of the first tow arm, the first U-member having bores through first and second legs of the first U-member;
the second tow are includes a second U-member situated at a front end of the second tow arm, the second U-member having bores through first and second legs of the second U-member;
the assembly further including a first removable pin extending through the bores in the first and second legs of the first U-member and the first bore of the first attachment flange; and
the assembly further including a second removable pin extending through the bores in the first and second legs of the second U-member and the second bore of the second attachment flange.

13. The assembly of claim 8, wherein:
a rear end of the first tow arm is threaded;
a rear end of the second tow arm is threaded;
the first coupling includes a first threaded receptor configured to threadedly receive the threaded rear end of the first tow arm and allow the rotational movement of the first coupling relative to the first tow arm; and
the second coupling includes a second threaded receptor configured to threadedly receive the threaded rear end of the second tow arm and allow the rotational movement of the second coupling relative to the second tow arm.

14. The assembly of claim 13, wherein:
the first coupling is configured to allow unobstructed use of the first push-type mower after uncoupling of the first tow arm from the first coupling; and
the second coupling is configured to allow unobstructed use of the second push-type mower after uncoupling of the second tow arm from the second coupling.

15. An assembly for towing first and second push-type mowers behind a riding mower, the assembly comprising:
a base plate configured for attachment to a hitch of the riding mower, the base plate having a channel situated axially behind right and left rear wheels of the riding mower;
a tow bar releasably disposed in the channel of the base plate, the tow bar having a first attachment flange and a second attachment flange;
a first tow arm releasably connected to the first attachment flange and configured for pivoting side to side movement along a horizontal of an axis of the tow bar;
a second tow arm releasably connected to the second end of the tow bar and configured for pivoting side to side movement along the horizontal of the axis of the tow bar;
a first coupling attachable to a front of the first push-type mower, the first coupling configured for releasable coupling with the first tow arm and to allow rotational movement of the first coupling relative to the first tow arm;
a second coupling attachable to a front of the second push-type mower, the second coupling configured for releasable coupling with the second tow arm and to allow rotational movement of the second coupling relative to the second tow arm; and
a mowing path gauge attachable to a front of the riding mower, the mowing path gauge configured to indicate combined mowing path width of the riding mower, the first push-type mower and the second push-type mower.

16. The assembly of claim 15, wherein the mowing path gauge comprises a rod having a length at least equal to a distance from an outer side of the first push-type lawn mower to an outer side of the second push-type lawn mower.

17. The assembly of claim 15, wherein the mowing path gauge is releasably connectable to the front of the riding mower.

* * * * *